United States Patent
Speck et al.

[11] Patent Number: 5,854,989
[45] Date of Patent: Dec. 29, 1998

[54] METHOD AND APPARATUS FOR MAINTAINING A PRESET VELOCITY OF A VEHICLE

[75] Inventors: Hans-Reimer Speck, Stuttgart; Christian Weber, Schwieberdingen; Thomas Huber, Beilstein, all of Germany

[73] Assignee: Robert Bosch, GmbH, Stuttgart, Germany

[21] Appl. No.: 652,582
[22] PCT Filed: Nov. 29, 1994
[86] PCT No.: PCT/DE94/01414
§ 371 Date: Jun. 7, 1996
§ 102(e) Date: Jun. 7, 1996
[87] PCT Pub. No.: WO95/15868
PCT Pub. Date: Jun. 15, 1995

[30] Foreign Application Priority Data
Dec. 7, 1993 [DE] Germany .......... 43 41 585.7

[51] Int. Cl.$^6$ ................ B60K 31/10
[52] U.S. Cl. ................ 701/93; 701/94
[58] Field of Search .............. 701/93, 94, 110; 180/178, 179, 175, 176; 123/352, 360, 361

[56] References Cited

U.S. PATENT DOCUMENTS

| | | | |
|---|---|---|---|
| 4,072,206 | 2/1978 | Larson et al. | 180/105 E |
| 4,849,892 | 7/1989 | McCombie | 364/426.04 |
| 4,943,923 | 7/1990 | Naito | 364/426.04 |
| 4,956,778 | 9/1990 | Naito | 364/426.04 |
| 4,969,531 | 11/1990 | Hirakata et al. | 180/179 |
| 5,024,284 | 6/1991 | Nakano et al. | 180/179 |
| 5,088,043 | 2/1992 | Akishino et al. | 364/426.04 |

FOREIGN PATENT DOCUMENTS

| | | |
|---|---|---|
| 2924391 | 12/1980 | Germany . |
| 3618844 | 12/1987 | Germany . |

*Primary Examiner*—Michael Zanelli
*Attorney, Agent, or Firm*—Fulbright & Jaworski, LLP.

[57] ABSTRACT

An adjusting element for maintaining the specified velocity is actuated in such a way that the acceleration of the vehicle is adjusted to predefined values dependent on the velocity.

10 Claims, 6 Drawing Sheets

METHOD AND APPARATUS FOR MAINTAINING A PRESET VELOCITY OF A VEHICLE

STATE OF THE ART

The invention pertains to a method and an apparatus for maintaining a vehicle at a specified velocity wherein an adjusting element influences the drive system independently of the driver's command.

A method and an apparatus of this kind are known from DE-OS 29 24 391. In this document, a vehicle is maintained at a specified velocity independently of the driver's command, the velocity being limited in particular to a maximum value, by the driving of an adjusting element on the basis of the difference between a preset desired velocity and a measured actual velocity. The adjusting element then takes care of changing the velocity of the vehicle.

In the known method, the action to reduce the vehicle velocity occurs only after the specified velocity has been exceeded, because only then does a difference exist. In addition, the relationship between the extent of the change in the torque generated by the vehicle's drive system to the extent of the resulting change in the vehicle velocity is different for each vehicle, for each drive system, and for each set of driving conditions.

The known method for maintaining a vehicle at a specified velocity is therefore unsatisfactory.

It is therefore the task of the present invention to provide measures for improving the method and the apparatus for maintaining a vehicle at a specified velocity, especially with a view to comfort and accuracy.

The adjusting element used within the scope of the known method is an electrical, hydraulic, or pneumatic adjusting element, which controls a final control element such as throttle valve or an injection pump lever, which influences the torque or power of the drive system and thus affects the velocity of the vehicle. The adjusting element can be installed in the conventional mechanical linkage between the gas pedal and the final control element, or, as a part of the electronic control of the drive system, it can serve as an adjusting element of an electrical control system independent of the driver's command without any mechanical connection. Especially in the case of a pneumatic adjusting element with a control cylinder driven by a proportional valve, it is necessary to keep in mind the basic principle involved, namely, that the control cylinder requires a certain minimum or maximum pressure at the beginning of the adjusting process or when there is a change in the effective direction of the adjusting process to actuate the final control element and to increase or lower the torque of the drive unit. This behavior is referred to in the following as "dead travel" or hysteresis. The known approach does not take this into account, for which reason it is not satisfactory.

Therefore, measures are presented below by means of which it is possible to improve the way in which a specified driving velocity can be maintained even when a pneumatic adjusting element is used.

A method for limiting the rpm's of an internal combustion machine is known from DE-OS 36 18 844 in which the derivative of the engine rpm's with respect to time is used to determine the rpm-reducing signal, so that it is possible to avoid overshooting the specified maximum rpm's. This approach based on the derivative with respect to time of the engine rpm's is also used to limit the vehicle velocity. This method does not provide any measures which can be taken when the specified vehicle velocity is exceeded, nor does it provide any measures associated with a pneumatic final control element, which means that it cannot provide a satisfactory solution to the problems cited above.

ADVANTAGES OF THE INVENTION

By means of the approach according to the invention, a method and an apparatus for maintaining a vehicle at a specified velocity are made available, in which a specified velocity is maintained with improved comfort and better accuracy. In particular, it is guaranteed by the approach according to the invention that the vehicle stops accelerating as soon as it reaches the specified velocity. This leads to the advantageous effect that the specified velocity is maintained essentially as soon as it is reached and that the measures for maintaining this velocity are in effect even before the specified velocity is reached.

These advantages are achieved not only when the specified velocity is reached from the direction of slower velocities but also when the specified velocity is approached from higher velocities. When the approach according to the invention is used to limit the vehicle velocity, particular advantages are obtained after a period of downhill driving, i.e., after the vehicle has reached a level stretch and is starting to approach the specified velocity again from the higher velocities.

It is advantageous that the intervention in the torque of the drive system begins at lower velocities in the case of accelerations with large absolute values than it does at accelerations with smaller absolute values.

As a result of the approach according to the invention, the curve of the vehicle acceleration during the buildup or automatic control phase leading to the specified velocity is predetermined. The behavior of the vehicle during this phase is therefore defined.

As a result of the approach according to the invention, furthermore, it is possible to use adjusting elements with dead travel or hysteresis between actuation and effect, especially pneumatic elements. It is also possible, however to use corresponding hydraulic or electrical adjusting elements. When adjusting elements of this type are used, the approach according to the invention guarantees that the adjusting element reacts to its drive signal at the very moment action is taken to intervene in the torque of the drive system.

Additional advantages can be derived from the following description of exemplary embodiments.

DESCRIPTION OF THE EXEMPLARY EMBODIMENTS

Figure 1:
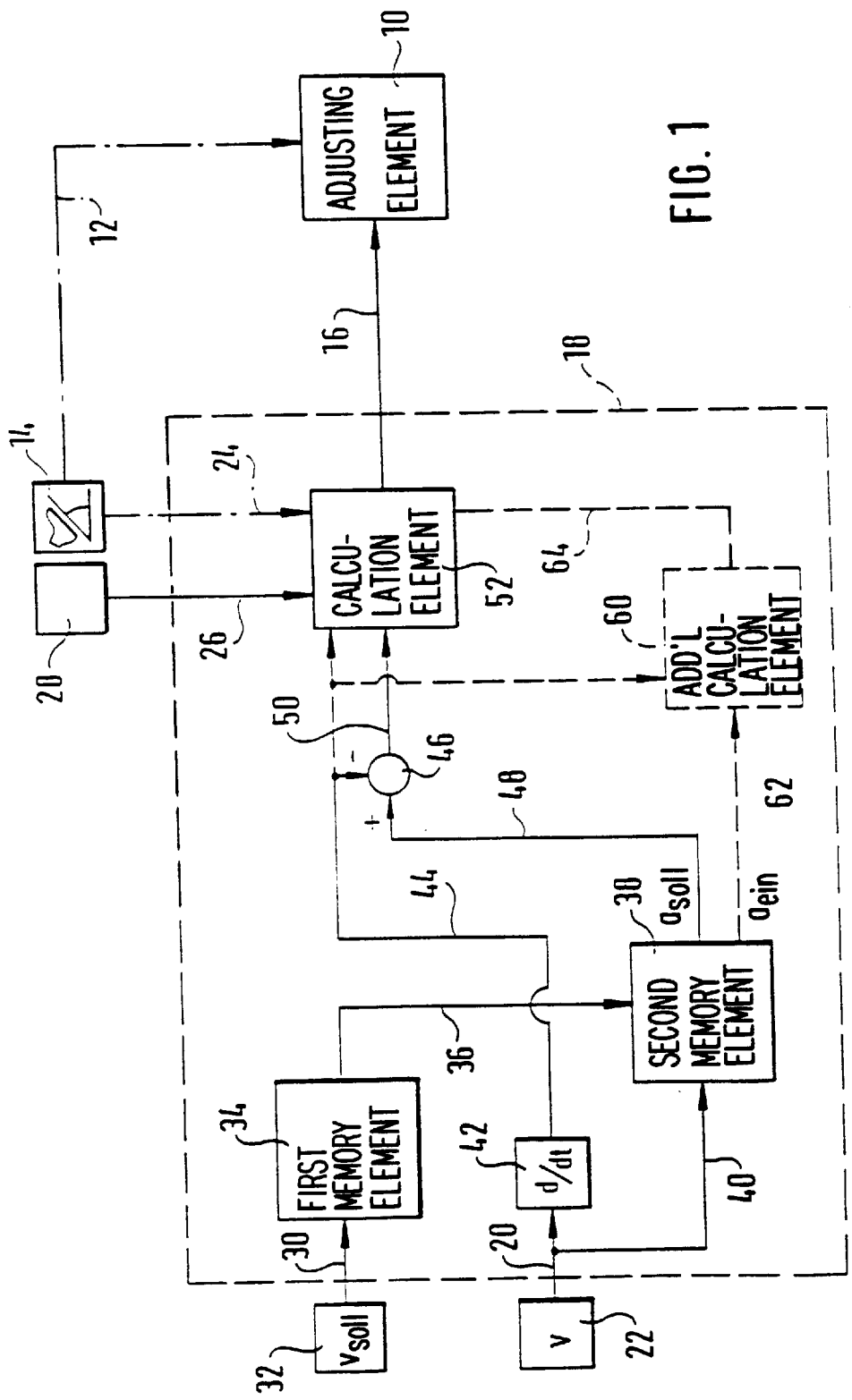
FIG. 1 shows a general block circuit diagram of a system for maintaining a vehicle at a specified velocity.

FIG. 1 shows the approach according to the invention on the basis of a general block circuit diagram. An adjusting element 10 influences the torque or horsepower of a drive system (not shown) of a vehicle, preferably an internal combustion engine machine. In the preferred exemplary embodiment, this adjusting element is a pneumatic adjusting element; in other advantageous embodiments, it is a hydraulic or electrical adjusting element. To control the power of the drive system, the adjusting element in the preferred exemplary embodiment of an internal combustion engine machine is connected to a final power control element (not shown), i.e., a throttle valve or an injection pump lever. In the preferred exemplary embodiment, adjusting element 10 is installed in a mechanical linkage 12, which connects an operating element 14 actuated by the driver, i.e., a gas pedal, to the final power control element. Adjusting element 10 serves here to actuate the final power control element independently of the position of gas pedal 14; in the preferred exemplary embodiment, adjusting element 10 is able to influence the power control element merely in a manner which throttles back the engine; that is, its maximum position is defined by the instantaneous position of gas pedal 14. Adjusting element 10 is actuated by way of a line 16. Line 16 represents the output line of a control unit 18. A first input line 20 from a measuring apparatus 22 for determining the vehicle velocity, another input line 24 from operating element 14 in a preferred embodiment, and input lines 26 from measuring apparatus 28 for determining additional operating parameters of the drive system and/or of the vehicle are wired to control unit 18. The latter set of measuring apparatus is illustrated for the sake of clarity in FIG. 1 only on the basis of one line and one measuring apparatus by way of example. In addition, in an advantageous exemplary embodiment, an additional input line 30 from an additional operating element 32 actuated by the driver is connected to control unit 18, by way of which the driver is able to set the specified velocity. Operating element 32 can be a lever, a set of buttons for entering a specified velocity, adjusting wheels, etc. In an advantageous exemplary embodiment, operating element 32 is the same as gas pedal 14, in which case a predetermined velocity value is assigned to each position of the pedal. Input line 30 of control unit 18 leads to a first memory element 34, output line 36 of which leads to a second memory element 38. Line 40, which branches off from input line 20, leads to the second memory element as a second input line. Line 20 leads to an element 42 for determining the vehicle acceleration. In the simplest case, element 42 is an element with differential behavior. Output line 44 of element 42 leads to a comparison site 46, to which in addition line 48, the output line of memory element 38, is also connected. Output line 50 of comparison site 46 leads to a calculation element 52, to which in addition, in an advantageous exemplary embodiment, lines 24, 26 lead. Output line 16 of calculation element 52 constitutes the output line of control unit 18.

In the preferred exemplary embodiment, where use is made of a pneumatic adjusting element, furthermore, the elements indicated in broken line in FIG. 1 are also provided. Line 44 leads here in supplemental fashion to calculation element 52 and to an additional calculation element 60. A line 62 from memory element 38 is also connected to this additional calculation element. Output line 64 of calculation element 60 leads to calculation element 52.

In the preferred exemplary embodiment of a vehicle velocity limiter, the final power control element is actuated by the driver by way of mechanical linkage 12. Adjusting element 10 also acts in this case on the final power control element and is connected mechanically in such a way that it can actuate the final power control element only between the position specified by the driver through the gas pedal and the idle position. The adjusting element itself can be pneumatic, hydraulic, or electric in nature.

The approach according to the invention is based on the basic idea of assigning a desired acceleration to each actual velocity as a function of the specified vehicle velocity and of using the deviation of the actual acceleration from this desired acceleration as a controlled variable for controlling the torque of the drive system and for maintaining the specified vehicle velocity. If, therefore, the desired acceleration is greater than the actual acceleration, the torque (injection quantity, air feed) is increased, whereas, if the desired acceleration is less than the actual acceleration, the torque is decreased. The change in the adjusting element and thus the change in the torque is limited in the throttle-opening direction by the position of the final power control element predetermined by the driver by way of the gas pedal.

The fixed desired velocity or the velocity which can be defined by the driver is stored in memory element 34. Depending on the stored desired velocity, a characteristic of the desired acceleration $a_{Soll}$ versus the actual velocity $v_{Ist}$ filed in memory element 38 is selected. FIGS. 3, 4 and FIGS. 6a to 6c and 7a to 7c show examples of characteristics of this type which were found to be suitable in an exemplary embodiment. A desired acceleration of zero is assigned to the specified desired velocity. Positive values for the desired acceleration are assigned to velocities under the desired velocity; and negative values for the desired acceleration are assigned to velocities above the desired velocity. The desired acceleration $a_{Soll}$ is read from a characteristic of this type as a function of the current actual velocity measured by measuring apparatus 22 and sent to comparison site 46. In parallel, the actual acceleration of the vehicle is calculated in element 42 from the measured values of the vehicle velocity. This can be done either by means of differentiation with respect to time or by calculating the difference between two vehicle velocity values detected on a fixed time grid. The actual acceleration value $a_{Ist}$ is sent via line 44 to comparison site 46 also. There, the difference (deviation) between the desired and the actual acceleration is determined and sent to calculation element 52. This element calculates the required increase or decrease in the torque of the drive system according to the polarity and magnitude of the difference and sends a drive signal I via line 16 to adjusting element 10, which brings about a change in the torque to make the actual acceleration approach the desired acceleration. To convert the difference into a drive signal, a conventional controller design of suitable dimensions with proportional, integral, and/or differential components can be provided.

In an advantageous exemplary embodiment, the driver actuates the final power control element by way of adjusting element 10 not by means of mechanical linkage 12 but rather by electrical means. In a design such as this, the position of the gas pedal is sent to calculation unit 52 via line 24; additional operating parameters of the drive system and/or of the vehicle, e.g., engine rpm's, engine temperature, gear position, etc., are also sent to it via line 26. Under normal operating conditions, a desired position for adjusting element 10 is determined on the basis of the position of the gas pedal and at least one of the operating parameters, and this is produced by way of an open-loop or closed-loop position control circuit (not shown). As a supplement to a system of this kind, the above-described method for maintaining a specified vehicle velocity works in a corresponding manner, where, depending on the current gas pedal position and under consideration of the operating parameters, a maximum position for adjusting element 10 is defined, which cannot be exceeded in maintaining the vehicle velocity.

If an electrical servomotor with feedback is used as adjusting element 10, the calculated displacement of adjusting element 10 usually becomes effective immediately. But if a pneumatic control cylinder driven by a proportional valve is used in mechanical linkage 12, then, as mentioned above, dead travel or hysteresis must be taken into account at the beginning of the displacement method or when the direction in which the cylinder acts is being changed. By means of the elements shown in broken line, these minimum or maximum pressures are adjusted in advance, that is, before the start of a displacement method for maintaining the vehicle velocity. For this purpose, an additional characteristic is predefined for each predefinable velocity; each of these characteristics describes a cut-in acceleration $a_{Ein}$, which depends on the actual velocity. If the actual acceleration is above or below this velocity-dependent cut-in acceleration value, then a drive signal is determined in calculation element 60, which signal initiates an increase or decrease in the pressure. This drive or the pressure control function lasts until the effects of the change in pressure are detected on the basis of the current vehicle acceleration. The pressure in the control cylinder required for displacement is therefore made available, when, on the basis of the difference between the actual and the desired acceleration, an intervention in the torque for maintaining the specified vehicle velocity occurs or the direction of the intervention changes. The corresponding adjustment method is therefore initiated immediately.

The approach described above can also be applied in an advantageous manner in conjunction with alternative drive concepts such as electric drives.

Figure 2:
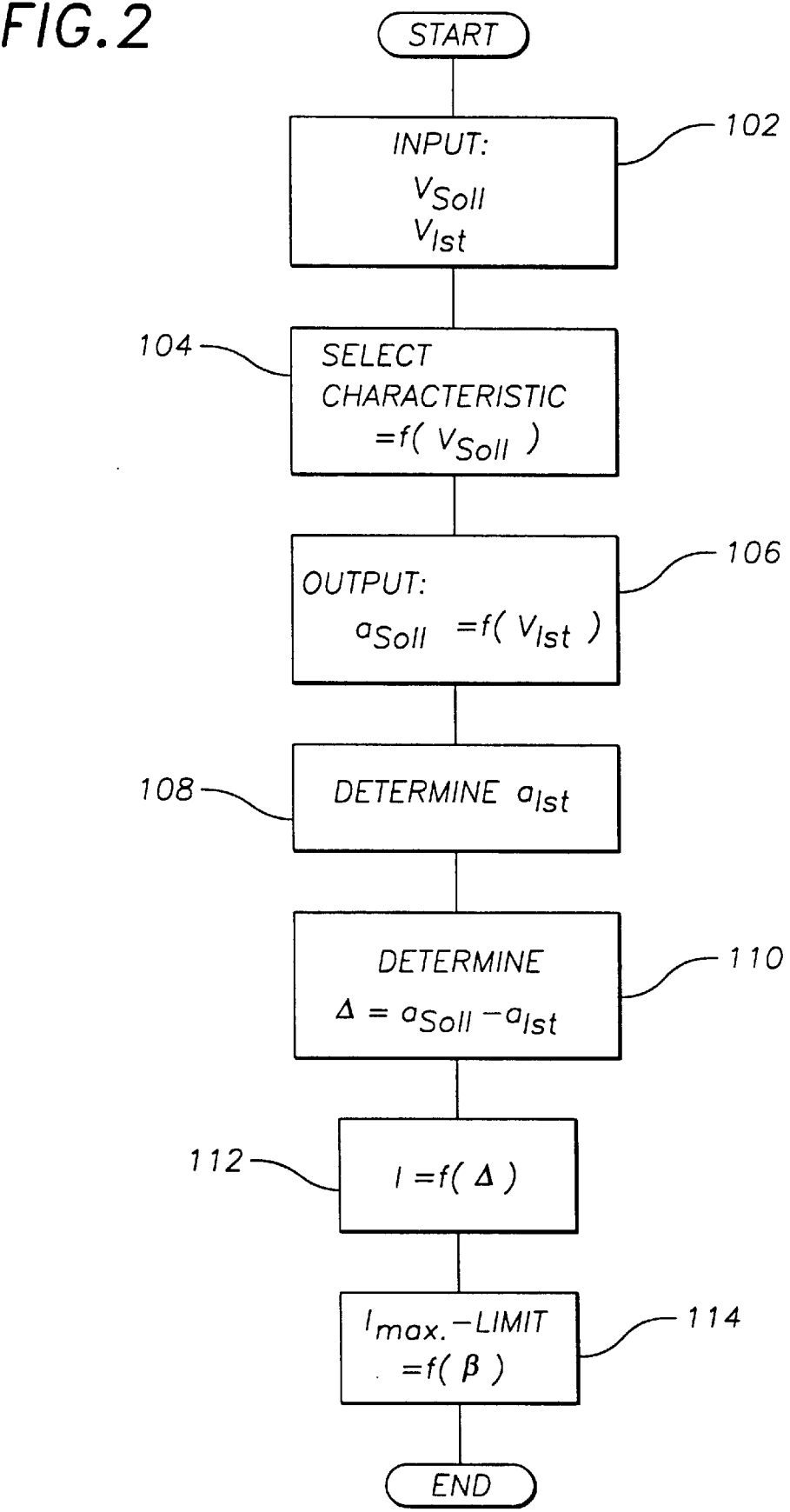
FIG. 2 shows a flow diagram of a first exemplary embodiment.

FIG. 2 shows a flow chart, which illustrates the realization of the method according to the invention as a computer program. After the section of the program in question is started, the stored, predefined velocity $v_{Soll}$, the detected actual velocity $v_{Ist}$, and, in an advantageous exemplary embodiment, the position β of the gas pedal are accepted as input in step 102. In the following step 104, a characteristic is selected from a stored family of characteristics on the basis of the desired velocity $v_{Soll}$; and in the following step 106, the desired acceleration $a_{Soll}$ is determined from this characteristic as a function of the current actual velocity.

Then, in step 108, the current actual acceleration of the vehicle is calculated from the actual velocity recorded in this run of the program and the actual velocity recorded in the preceding run of the program; in the following step 110, the difference Δ between the desired and the actual acceleration is calculated. In the following step 112, a drive signal value I for the adjusting element is determined on the basis of the difference according to a predefined control strategy. This value can be a pressure value, the pulse width of a pulse-duty factor, a power value, a position value, etc., and in each case represents a certain position of adjusting element 10 or of the final power control element or a certain torque of the drive system. In an advantageous exemplary embodiment with electric control of the final power control element in response to the driver's command, a maximum value $I_{max}$ for the drive signal value I is determined in the following step 114 as a function of the position β of the gas pedal and possibly other operating parameters; the drive signal value calculated in step 112 is limited to this value. In the case of a mechanical link between the final control element and the gas pedal, step 114 is omitted. This section of the program now ends and is ready to be run again when needed.

Figure 3:
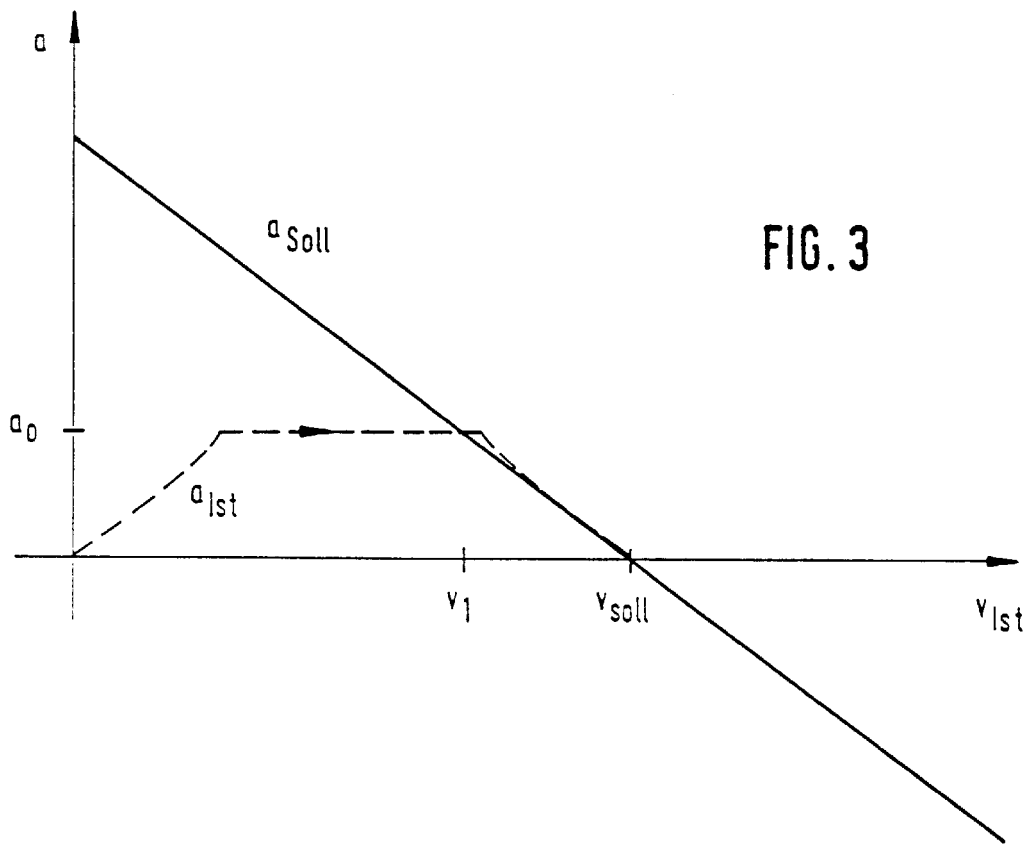
FIGS. 3 and 4 are diagrams which illustrate how the first exemplary embodiment functions.
Figure 4:
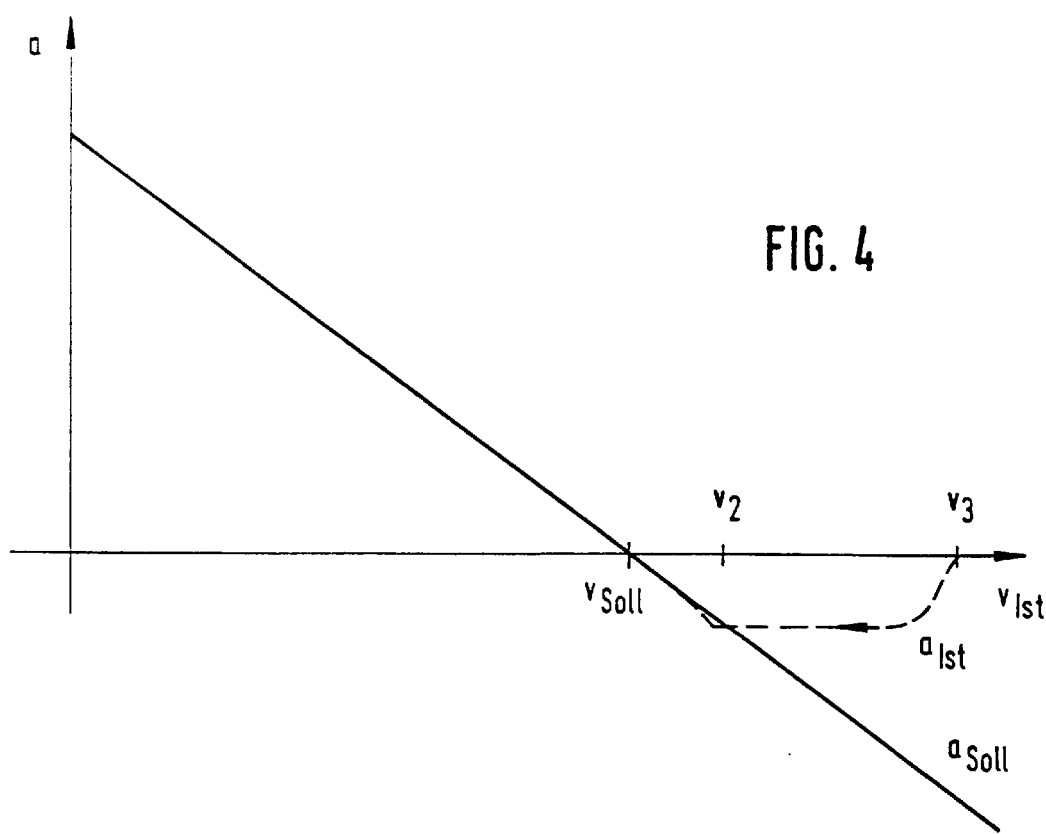

FIGS. 3 and 4 show how the method according to FIG. 2 actually works. In each case, the actual velocity $v_{Ist}$ is plotted horizontally and the acceleration a of the vehicle vertically. Let a certain velocity $v_{Soll}$ be specified, to which is assigned the characteristic (solid line) shown by way of example for the velocity-dependent desired acceleration $a_{Soll}$.

FIG. 3 shows an acceleration method from a standstill (see broken line). First, the vehicle accelerates upon appropriate input from the driver with an initial value of $a_0$. The measures for maintaining the vehicle velocity $v_{Soll}$ have no effect on the torque of the drive system, because the influence which the adjusting element can exert in the sense of increasing the acceleration is limited by the driver's input. At a velocity of $v_1$, the situation changes. At this point, the actual acceleration exceeds the desired acceleration. As a result, the difference Δ becomes negative, and a drive signal value for the adjusting element to reduce the torque of the drive system is calculated and transmitted. The vehicle acceleration therefore drops back to the desired value $a_{Soll}$. Because the vehicle continues to accelerate, the vehicle velocity continues to increase; but because of the automatic control the acceleration decreases until it reaches the velocity-dependent desired acceleration. Once the desired velocity $v_{Soll}$ is reached, it is maintained from then on because the acceleration is zero, i.e., has been adjusted to zero. It is guaranteed that, once the desired velocity is reached, the vehicle no longer accelerates; the predefined vehicle velocity is therefore maintained as soon as it is reached without being overshot.

In the driving situation shown in FIG. 4, the vehicle is traveling down a hill; the velocity therefore increases beyond vSoll. There is no possibility of a control intervention to maintain the velocity, because the driver has let go of the pedal. If, after the downhill ride, a flat stretch ($v_3$) comes, the driver will increase the pedal travel, and the control intervention for maintaining the velocity will reduce the torque and result in a negative acceleration. The vehicle slows down. At velocity $v_2$, the sign of the difference between the desired and the actual acceleration changes. The torque is increased as a function of the difference between the desired and actual acceleration. The vehicle is slowed down progressively as the deceleration decreases; when the desired velocity is reached, an acceleration of zero is specified. In this driving situation, too, the velocity $v_{Soll}$ will therefore be maintained again as soon as it is reached.

If the driver does not let go of the pedal completely during the downhill ride, then here, too, a corresponding intervention depending on the difference Δ occurs, and the adjusting element will be adjusted between the maximum position specified by the driver and the idle position so that the acceleration is automatically controlled.

Figure 5:
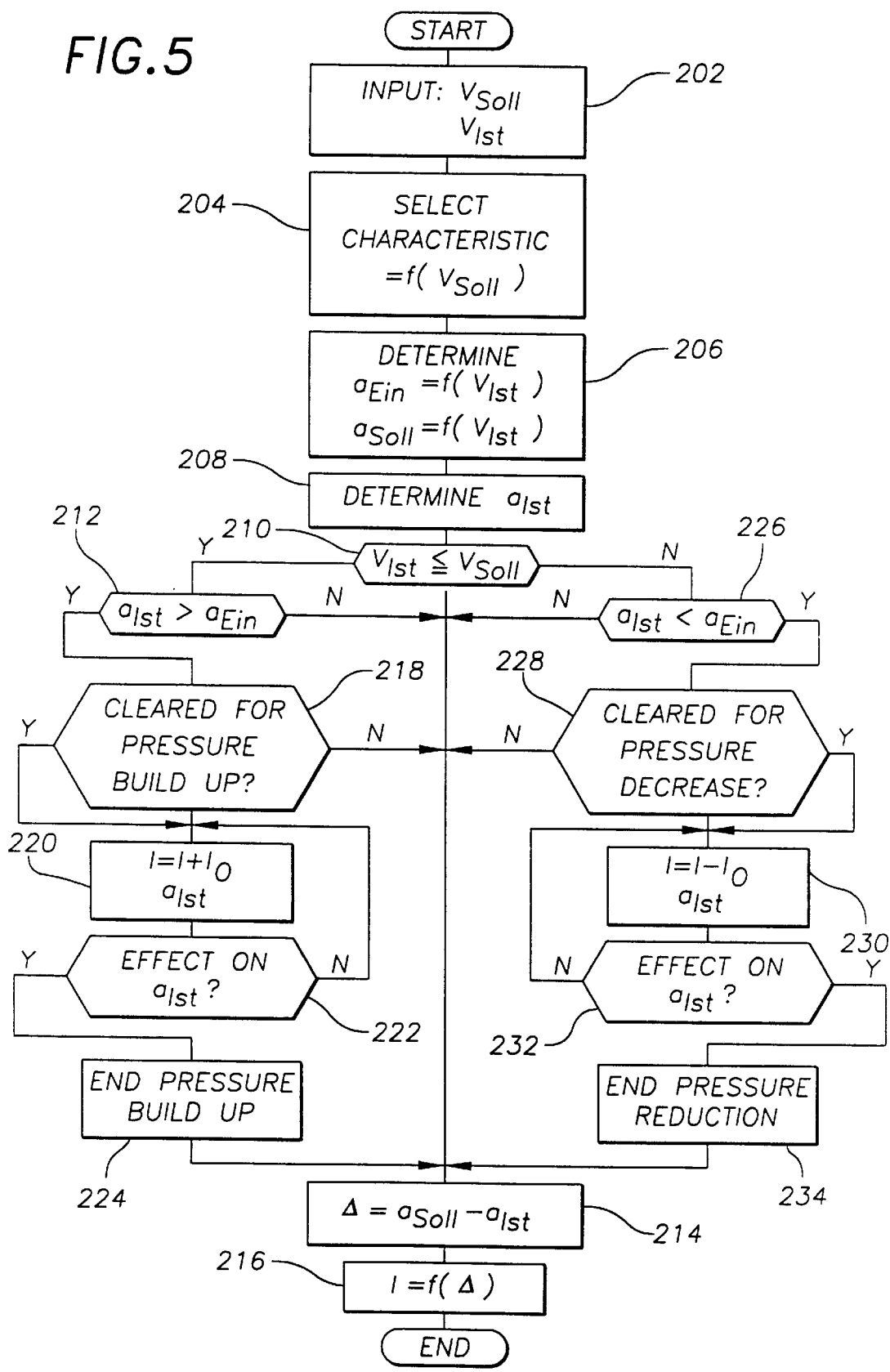
FIG. 5 shows a flow diagram of a second exemplary embodiment in connection with the use pneumatic adjusting elements.

FIG. 5 shows another flow chart, which illustrates a realization in conjunction with a pneumatic adjusting element. After the program has started, desired velocity $v_{Soll}$ and actual velocity $v_{Ist}$ are accepted as input in step 202; in the following step 204, the characteristics for the desired acceleration $a_{Soll}$ and the cut-in acceleration $a_{Ein}$ are selected as a function of the desired velocity. In the next step 206, the specified cut-in acceleration $a_{Ein}$ and the desired acceleration aSoll are determined from the characteristics on the basis of the current actual velocity. Then, in step 208, the actual acceleration $a_{Ist}$ is calculated from the difference between the current vehicle velocity and the velocity recorded in the preceding run of the program. Then, question step 210 checks to see if the actual velocity is below the specified desired velocity. If the actual velocity is smaller than or equal to the desired velocity, then in step 212 the program checks to see whether the actual acceleration is greater than the cut-in acceleration. If this is not the case, then a flag, described further below, for the pressure control is set back; and, in analogy to FIG. 2, the difference between the desired and the actual acceleration is determined in step 214; in the next step 216, drive signal value I is calculated on the basis of this difference, and the program terminates. When, therefore, an actual velocity is below the desired velocity and simultaneously the actual acceleration is below the cut-in acceleration, a method of acceleration control is carried out.

If it is concluded in step 212 that the actual acceleration is greater than the cut-in acceleration, then in the following question block 218, on the basis of a flag set previously, the program checks to see whether a pressure buildup in the control cylinder of adjusting element 10 is required. If this is not the case, that is, if this pressure buildup has already been accomplished, then the program continues with steps 214 and 216; in the opposite case, the drive signal value I is increased by a predetermined value $I_0$ in step 220. Simultaneously, the current actual acceleration $a_{Ist}$ is also determined in step 220, and then question step 222 checks to see whether the change in the drive has had any effect on the actual acceleration. If this is not the case, step 220 is repeated. If in step 224 an effect on the actual acceleration is detected, the pressure buildup is considered completed, and a corresponding flag is set. Then the program continues with steps 214 and 216.

The procedure is similar when in step 210 it has been concluded that the actual velocity is above the desired value. Then, step 226 checks to see whether the negative value of the actual acceleration is smaller than the negative value of the cut-in acceleration. If this is not the case, the flag for the pressure control is set back, and the program continues with steps 214 and 216. In the opposite case, the program checks in step 228 on the basis of the flag to see whether a pressure reduction is needed in the control cylinder. If this is not the case, that is, if this had already happened, the program continues with steps 214 and 216, whereas in the opposite case, in step 230, the drive signal value is lowered by a predefined value $I_0$ and the current actual acceleration is determined. In the following question step 232, the program checks to see whether the change in the drive signal value has led to a corresponding change in the actual acceleration. If this is not the case, step 230 is repeated. Otherwise, the pressure reduction is recognized as have been completed in step 234; the flag is set; and the program continues with steps 214 and 216.

Figure 6A:
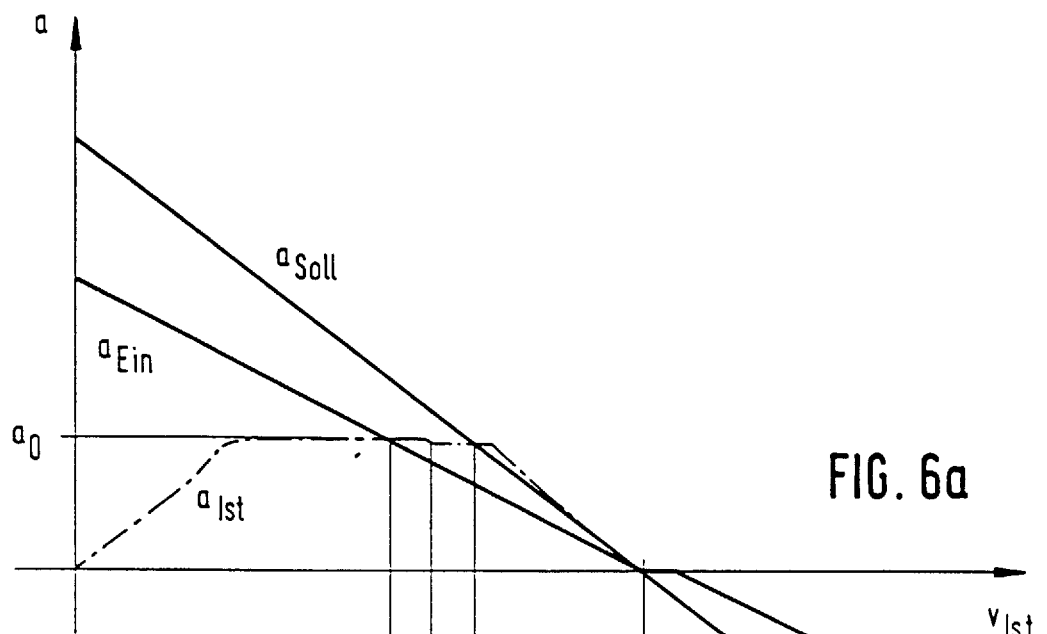
FIGS. 6a to 6c and 7a to 7c are diagrams which illustrate how the second exemplary embodiment functions.
Figure 6B:
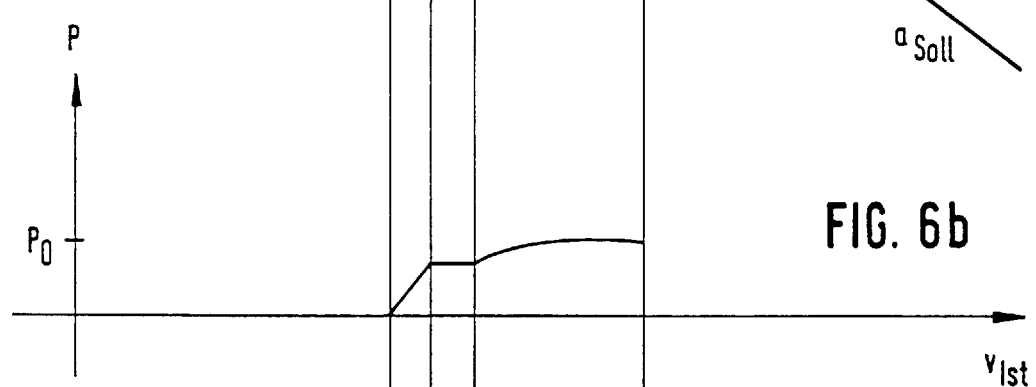
Figure 6C:
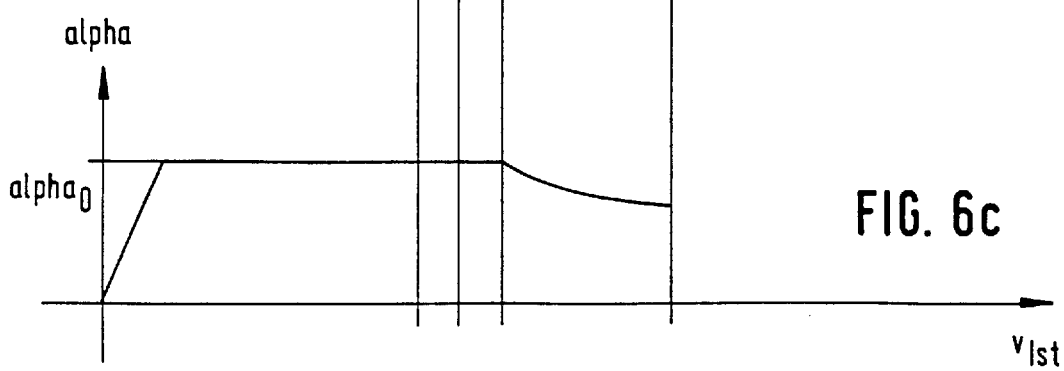

The way in which this method works is illustrated in greater detail in FIGS. 6a to 6c and 7a to 7c. In FIG. 6a, the acceleration of the vehicle is plotted versus the actual velocity; in FIG. 6b, the pressure in the control cylinder is plotted versus the actual velocity; and in FIG. 6c, the position of the injection pump lever is plotted versus the actual velocity. Here, too, a selected desired velocity $v_{Soll}$ is shown, to which are assigned the illustrated characteristics for the desired acceleration aSoll and the cut-in acceleration $a_{Ein}$ as a function of the actual velocity. Here, too, the vehicle is first accelerated from a standstill with an acceleration of $a_0$. The injection pump lever stands at a value of $\alpha_0$ as a result of the driver's command; the control cylinder pressure in this case is zero, because no intervention to decrease the engine torque via the adjusting element is required. At velocity $v_0$, the actual acceleration of the vehicle intersects the value of the cut-in acceleration assigned to $v_0$. As shown in FIG. 6b, this leads to an increase in the control cylinder pressure to the minimum pressure $P_0$, which has no effect on the position of the injection pump lever. At time $v_1$, the actual acceleration intersects the desired acceleration, as a result of which a reaction occurs to limit the vehicle velocity. The control cylinder pressure corresponds to the minimum pressure at least by this point, so that the control intervention familiar from FIG. 3 makes itself felt immediately with respect to the position of the injection pump lever and therefore on the torque of the drive system. In accordance with the change in the desired acceleration, the acceleration of the vehicle is then regulated by the change in the control cylinder pressure and in the pump lever position until the predefined velocity has been reached.

Figure 7A:
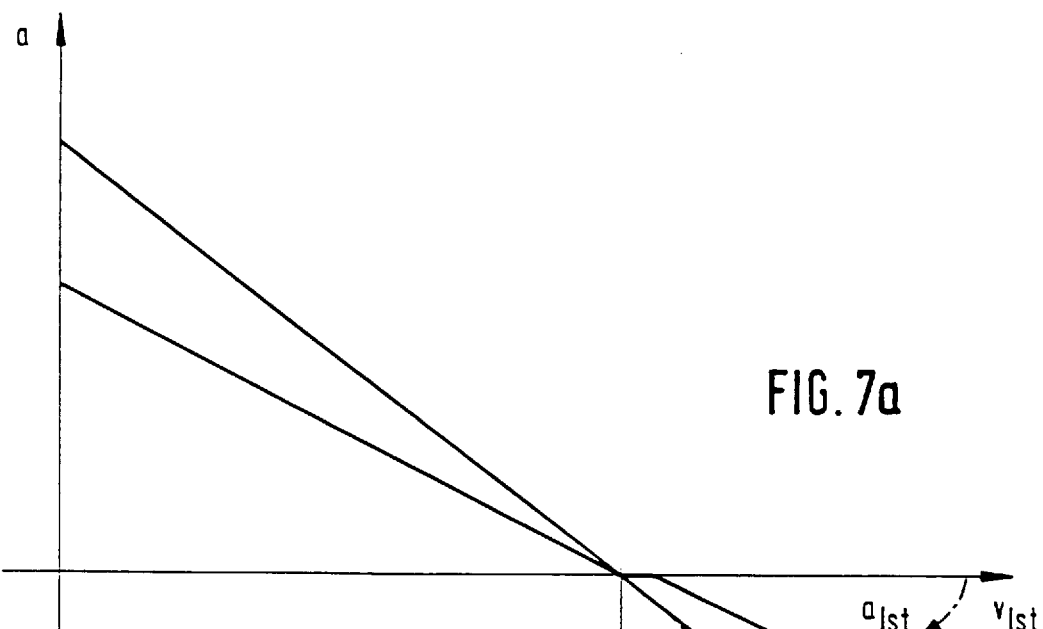
Figure 7B:
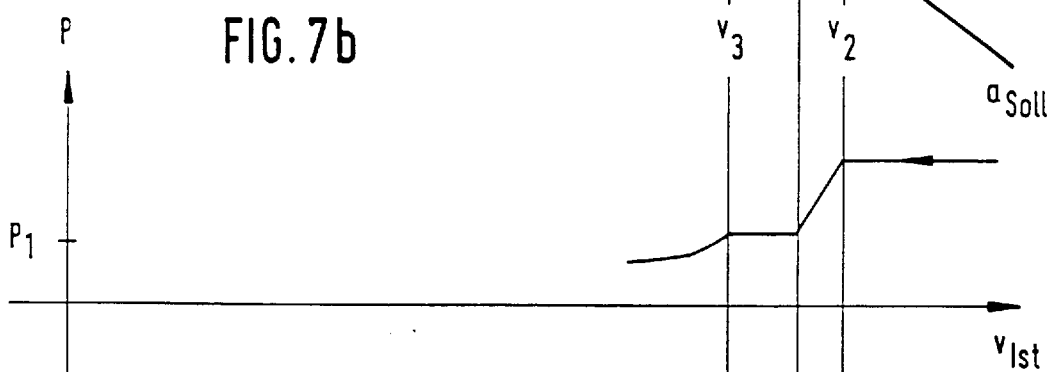
Figure 7C:
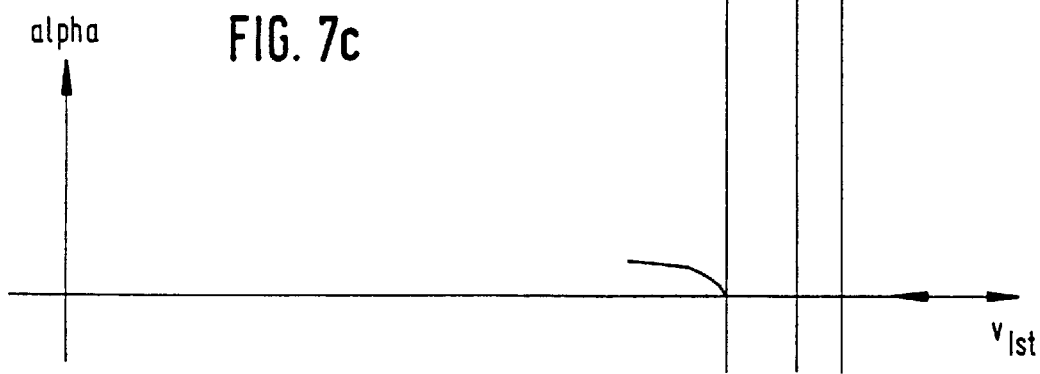

FIGS. 7a to 7c shows in a corresponding manner the behavior of the vehicle at velocities above the desired velocity. At the end of downhill stretch, a negative acceleration is produced by the driving velocity limiter, which does so by taking appropriate action on the position of the injection pump lever, and the vehicle slows down. This leads in the extreme case to a maximum pressure $P_{max}$ in the control cylinder and to the idle position of the pump lever. At velocity $v_2$, the negative actual acceleration exceeds the negative value of the cut-in acceleration, so that the pressure reduction in the control cylinder occurs without having any effect on the pump lever position. This reduction is ended no later than velocity $V_3$, at which the negative actual acceleration exceeds the negative desired acceleration, which results in a control intervention to increase the torque. At this point, a pressure $P_1$, which pressure allows an immediate reaction, has been reached in the control cylinder. Starting from velocity $v_3$, accordingly, the control cylinder pressure is lowered in accordance with the difference between the desired and the actual acceleration, and the injection pump lever position thus increased correspondingly. As a result, in analogy to FIG. 4, the actual acceleration is automatically adjusted to match the specified desired acceleration value until the desired velocity $V_{Soll}$ has been reached, which is then maintained at essentially the same value as soon as it is reached.

In an advantageous exemplary embodiment, the above-described method is active only at velocities above or below the specified velocity $V_{Soll}$.

In another exemplary embodiment, the driver can activate the method by the use of a switching apparatus, or the method can be activated externally by way of a communications system.

We claim:

1. Method for maintaining a velocity of a vehicle at a specified velocity, said vehicle comprising a drive system supplying power for moving the vehicle, said method comprising:

providing an operating element usable by a driver to actuate an adjusting element, which influences the power of the drive system of the vehicle;

actuating the adjusting element under operating conditions so as to maintain the specified velocity independently of the driver;

actuating the adjusting element so as to control acceleration of the vehicle to match a specified acceleration value which is derived as a function of the vehicle velocity; and wherein the adjusting element is automatically actuated to control acceleration for a first acceleration beginning at a first velocity, and for a second acceleration with a smaller absolute value than the first acceleration beginning at a second velocity, the absolute value of the difference between the first velocity and the specified velocity being greater than the absolute value of the difference between the second velocity and the specified velocity.

2. Method according to claim 1, wherein the specified acceleration values at an actual velocity lower than the specified velocity are positive and in general increase with decreasing actual velocity, whereas the specified vehicle acceleration values at actual velocities greater than the specified velocity are negative and generally increase in their absolute value with increasing actual velocity.

3. Method according to claim 1 wherein the value of the specified acceleration is zero when the actual velocity is the same as the specified velocity.

4. Method according to claim 1 wherein a correlation is provided between the actual velocity values and the specified vehicle acceleration values.

5. Method according to claim 4 wherein, for each specifiable velocity, a second correlation is provided, which defines an acceleration cut-in value as a function of the actual velocity, the values for the cut-in acceleration being smaller in their absolute value than the specified vehicle acceleration values.

6. Method according to claim 1 wherein the specified velocity can be adjusted by the driver and in that, for each adjustable velocity, a correlation is provided between the actual velocity and the specified acceleration values.

7. Method according to claim 1 wherein the adjusting element is a pneumatic adjusting element.

8. Method according to claim 7 wherein the pressure in the pneumatic adjusting element is increased in advance to a value which ensures that the torque of the drive system will react immediately to a change in the pressure in the adjusting element when a drive signal is received or when the direction in which the drive signal acts changes.

9. Apparatus for maintaining a velocity of a vehicle at a specified velocity, said vehicle having a drive system delivery power for moving the vehicle, said apparatus comprising:

an adjusting element which influences the power of the drive system of the vehicle;

an operating element actuating said adjusting element responsive to operation of the operating element by a driver;

an automatic acceleration controller actuating the adjusting element so as to control acceleration of the vehicle to match a specified acceleration value and to maintain the specified velocity, said specified acceleration value being predetermined as a function of the vehicle velocity; and p1 the automatic acceleration controller actuating the adjusting element for a first acceleration beginning at a first velocity, and for a second acceleration with a smaller absolute value than the first acceleration beginning at a second velocity, the absolute value of the difference between the first velocity and the specified velocity being greater than the absolute value of the difference between the second velocity and the specified velocity.

10. Method for maintaining a vehicle at a desired velocity, said vehicle comprising a drive system which generates horsepower and an adjusting element which influences the horsepower of the drive system, said adjusting element, under operating conditions, being actuated so as to maintain the desired velocity independently of the driver, said method comprising:

specifying a desired vehicle velocity, determining an actual vehicle velocity, determining a desired acceleration value as a function of said actual vehicle velocity, determining an actual vehicle acceleration as a function of said actual vehicle velocity, and actuating the adjusting element so that the actual vehicle acceleration matches the desired vehicle acceleration, the actuation of said adjusting element beginning when said actual vehicle acceleration is greater than or equal to said desired acceleration.

* * * * *

UNITED STATES PATENT AND TRADEMARK OFFICE
CERTIFICATE OF CORRECTION

PATENT NO.      :   5,854,989

DATED           :   December 29, 1998

INVENTOR(S)     :   Speck et al.

It is certified that error appears in the above-identified patent and that said Letters Patent are hereby corrected as shown below:

In Claim 9, column 10, line 11, after "and" delete  – – p1 – –.

Signed and Sealed this

Twenty-seventh Day of June, 2000

Attest:

Q. TODD DICKINSON

*Attesting Officer*   *Director of Patents and Trademarks*